(12) United States Patent
Audhkhasi et al.

(10) Patent No.: US 11,495,213 B2
(45) Date of Patent: Nov. 8, 2022

(54) NOISE SPEED-UPS IN HIDDEN MARKOV MODELS WITH APPLICATIONS TO SPEECH RECOGNITION

(71) Applicant: UNIVERSITY OF SOUTHERN CALIFORNIA, Los Angeles, CA (US)

(72) Inventors: Kartik Audhkhasi, White Plains, NY (US); Osonde Osoba, Los Angeles, CA (US); Bart Kosko, Hacienda Heights, CA (US)

(73) Assignee: University of Southern California, Los Angeles, CA (US)

( * ) Notice: Subject to any disclaimer, the term of this patent is extended or adjusted under 35 U.S.C. 154(b) by 1246 days.

(21) Appl. No.: 14/802,760

(22) Filed: Jul. 17, 2015

(65) Prior Publication Data

US 2016/0005399 A1    Jan. 7, 2016

Related U.S. Application Data

(63) Continuation-in-part of application No. 13/949,048, filed on Jul. 23, 2013, now Pat. No. 9,390,065.

(Continued)

(51) Int. Cl.
*G10L 25/36* (2013.01)
*G10L 15/14* (2006.01)
(Continued)

(52) U.S. Cl.
CPC .......... *G10L 15/144* (2013.01); *G10L 15/063* (2013.01); *G10L 25/33* (2013.01); *G10L 25/36* (2013.01)

(58) Field of Classification Search
CPC ...... G06F 11/2257; G06F 17/10; G06F 17/50; G06F 19/3456; G06Q 10/06398;
(Continued)

(56) References Cited

U.S. PATENT DOCUMENTS 5,465,321 A * 11/1995 Smyth ................. G06F 11/2257
376/216
2003/0216896 A1    11/2003 Betts et al.
(Continued)

OTHER PUBLICATIONS

Osoba, O. et al. 2013. The Noisy Expectation-Maximization Algorithm, Fluctuation and Noise Letters, vol. 12, No. 13, 1350012-1 1350012-30, Sep. 2013.
(Continued)

*Primary Examiner* — Kandasamy Thangavelu
(74) *Attorney, Agent, or Firm* — Brooks Kushman P.C.

(57) ABSTRACT

A learning computer system may estimate unknown parameters and states of a stochastic or uncertain system having a probability structure. The system may include a data processing system that may include a hardware processor that has a configuration that: receives data; generates random, chaotic, fuzzy, or other numerical perturbations of the data, one or more of the states, or the probability structure; estimates observed and hidden states of the stochastic or uncertain system using the data, the generated perturbations, previous states of the stochastic or uncertain system, or estimated states of the stochastic or uncertain system; and causes perturbations or independent noise to be injected into the data, the states, or the stochastic or uncertain system so as to speed up training or learning of the probability structure and of the system parameters or the states.

20 Claims, 3 Drawing Sheets

Related U.S. Application Data (60) Provisional application No. 62/032,385, filed on Aug. 1, 2014, provisional application No. 62/025,664, filed on Jul. 17, 2014, provisional application No. 61/674,615, filed on Jul. 23, 2012.

(51) Int. Cl.
*G10L 15/06* (2013.01)
*G10L 25/33* (2013.01)

(58) Field of Classification Search
CPC ............. G06Q 700/259; G05B 13/024; G06K 9/6226; G10L 15/144; G10L 15/063; G10L 25/33; G10L 25/36
See application file for complete search history.

(56) References Cited

U.S. PATENT DOCUMENTS

| | | | |
|---|---|---|---|
| 2004/0167669 A1* | 8/2004 | Karlsson ................ | G01C 21/12 700/259 |
| 2006/0293873 A1 | 12/2006 | Gardner et al. | |
| 2007/0011119 A1 | 1/2007 | Thaler | |
| 2007/0118286 A1 | 5/2007 | Wang et al. | |
| 2007/0244575 A1 | 10/2007 | Wojsznis et al. | |
| 2008/0247274 A1 | 10/2008 | Seltzer et al. | |
| 2009/0299496 A1* | 12/2009 | Cade .................... | G05B 13/024 700/29 |
| 2011/0040487 A1* | 2/2011 | Hovorka ............. | G06F 19/3456 702/19 |
| 2011/0064278 A1 | 3/2011 | Wu et al. | |
| 2011/0093250 A1 | 4/2011 | Lin et al. | |
| 2012/0316845 A1* | 12/2012 | Grey ............... | G06Q 10/06398 703/2 |
| 2013/0041859 A1 | 2/2013 | Esterlilne | |
| 2014/0025356 A1* | 1/2014 | Kosko .................... | G06F 17/10 703/2 |
| 2015/0279031 A1* | 10/2015 | Cavusoglu ........... | G06K 9/6226 382/103 |
| 2016/0019459 A1 | 1/2016 | Audhkhasi et al. | |
| 2016/0034814 A1 | 2/2016 | Audhkhasi et al. | |
| 2016/0356125 A1* | 12/2016 | Bello .................... | G06Q 10/04 |
| 2017/0060810 A1* | 3/2017 | Preston ................... | G06F 17/50 |

OTHER PUBLICATIONS

USPTO. 2016. Notice of Allowance, dated May 17, 2016, for U.S. Appl. No. 13/949,048, entitled "Iterative Estimation of System Parameters Using Noise-Like Perturbations".
An, G. 1996. The Effects of Adding Noise During Backpropagation Training on a Generalization Performance. Neural Computation, vol. 8, No. 3, pp. 643-674, 1996.
Audhkhasi, K. et al. 2013. Noisy Hidden Markov Models for Speech Recognition. In 2013 International Joint Conference on Neural Networks, Proceedings (IJCNN-2013), 8 pages.
Audhkhasi, K. et al. 2013. Noise Benefits in Backpropagation and Deep Bidirectional Pre-Training. In 2013 International Joint Conference on Neural Networks, Proceedings (IJCNN-2013), 6 pages.
Bishop, C.M. 1995. Training with Noise is Equivalent to Tikhonov Regularization. Neural Computation, vol. 7, No. 1, pp. 108-116, 1995.
Fessler, J.A. et al. 1994. Space-Alternating Generalized Expectation-Maximization Algorithm. IEEE Transactions on Signal Processing, vol. 42, pp. 2664-2677.
Franzke, B. et al. 2011. Noise can speed convergence in Markov chains. Physical Review E 84 (2011) 041112.
Hudson, H.M. et al. 1994. Accelerated Image Reconstruction using Ordered Subsets of Projection Data. IEEE Transactions on Medical Imaging, vol. 13, pp. 601-609.
Jordan, M.I. et al. 2015. Machine Learning: Trends, Perspectives, and Prospects. Science, vol. 34, No. 6245, Jul. 17, 2015, pp. 255-260.
Osoba, O.A. 2013. Noise Benefits in Expectation-Maximization Algorithms. A Dissertation Presented to the Faculty of the USC Graduate School, University of Southern California, in partial fulfillment of the requirements for the degree Doctor of Philosophy (Electrical Engineering), Aug. 2013, 256 pages.
Osoba, O. et al. 2011. Noise Benefits in the Expectation-Maximization Algorithm: NEM Theorems and Models. Proceedings of International Joint Conference on Neural Networks, San Jose, California, USA, Jul. 31-Aug. 5, 2011, pp. 3178-3183.
Osoba, O. et al. 2013. Noise-Enhanced Clustering and Competitive Learning Algorithms. Neural Networks, vol. 37, pp. 132-140.
Osoba, O. et al. 2013. Erratum to Noise-Enhanced Clustering and Competitive Learning Algorithms. Neural Networks, vol. 37, 1 page.
USPTO. 2016. Non-final Office Action, dated Jan. 5, 2016, for U.S. Appl. No. 13/949,048, entitled "Iterative Estimation of System Parameters Using Noise-Like Perturbations".
Final Office Action dated Nov. 16, 2018 for U.S. Appl. No. 14/816,999, filed Aug. 3, 2015, 68 pgs.
Final Office Action dated Nov. 16, 2018 for U.S. Appl. No. 14/803,797, filed Jul. 20, 2015, 78 pgs.
Graves, A. et al., "Towards End-to-End Speech Recognition with Recurrent Neural Networks," Proceedings of the 31st International Conference on Machine Learning, Beijing, China, 2014. JMLR: W&CP vol. 32, pp. 1-9.
Hollis, P.W. et al., "A Neural Network Learning Algorithm Tailored for VLSI Implementation," IEEE Transactions on Neural Networks, v. 5, n. 5, pp. 784-791, 1994.
Sermanet, P. et al., "OverFeat: Integrated Recognition, Localization and Detection using Convolutional Networks," Feb. 24, 2014, arXiv—Cornell University Library, (https://arxiv.org/abs/1312.6229), pp. 1-16.
Non-final Office Action dated Feb. 15, 2018 for U.S. Appl. No. 14/816,999, filed Aug. 3, 2015, 70 pgs.
Non-final Office Action dated Jan. 5, 2016 for U.S. Appl. No. 13/949,048, filed Jul. 23, 2013, 23 pgs.
Non-final Office Action dated Feb. 15, 2018 for U.S. Appl. No. 14/803,797, filed Jul. 20, 2015, 79 pgs.
Non-Final Office Action dated Feb. 26, 2020 for U.S. Appl. No. 14/803,797, filed Jul. 20, 2015, 50 pgs.
Non-Final Office Action dated Feb. 27, 2020 for U.S. Appl. No. 14/816,999, filed Aug. 3, 2015, 76 pgs.
Meng, X. et al., "Noisy Training for Deep Neural Networks," Jul. 9-13, 2014, 2014 IEEE China Summit & International Conference on Signal and Information Processing (ChinaSIP), pp. 16-20.
Poole, B. et al., "Analyzing Noise in Autoencoders and Deep Networks," Jun. 6, 2014, arXiv, pp. 1-10.
Sukhbaatar, S. et al., "Learning from Noisy Labels with Deep Neural Networks," Jun. 9, 2014, arXiv, pp. 1-10.

* cited by examiner

NOISE SPEED-UPS IN HIDDEN MARKOV MODELS WITH APPLICATIONS TO SPEECH RECOGNITION

CROSS-REFERENCE TO RELATED APPLICATION

This application claims the benefit of U.S. provisional application Ser. No. 62/025,664 filed Jul. 17, 2014 and claims the benefit of U.S. provisional application Ser. No. 62/032,385 filed Aug. 1, 2014, and is a continuation-in-part of U.S. application Ser. No. 13/949,048 filed Jul. 23, 2013, now U.S. Pat. No. 9,390,065 issued Jul. 12, 2016, which claims the benefit of U.S. provisional application Ser. No. 61/674,615 filed Jul. 23, 2012, the disclosures of which are hereby incorporated in their entirety by reference herein.

BACKGROUND

1. Technical Field

This disclosure relates to the training of hidden Markov models.

2. Description of Related Art

A hidden Markov model (HMM) is a probabilistic model for time series data. Its many applications include speech recognition, computational biology, see A. Krogh, M. Brown, I. S. Mian, K. Sjolander, and D. Haussler, "Hidden Markov models in computational biology: Applications to protein modeling," Journal of molecular biology, vol. 235, no. 5, pp. 1501-1531, 1994, S. R. Eddy, "Profile hidden Markov models.," Bioinformatics, vol. 14, no. 9, pp. 755-763, 1998, K. Karplus, C. Barrett, and R. Hughey, "Hidden Markov models for detecting remote protein homologies.," Bioinformatics, vol. 14, no. 10, pp. 846-856, 1998; computer vision, see J. Yamato, J. Ohya, and K. Ishii, "Recognizing human action in time-sequential images using hidden Markov model," in Proc. CVPR. IEEE, 1992, pp. 379-385., M. Brand, N. Oliver, and A. Pentland, "Coupled hidden Markov models for complex action recognition," in Proc. CVPR. IEEE, 1997, pp. 994-999, wavelet-based signal processing, M. S. Crouse, R. D. Nowak, and R. G. Baraniuk, "Wavelet-based statistical signal processing using hidden Markov models," IEEE Transactions on Signal Processing, vol. 46, no. 4, pp. 886-902, 1998, control theory, R. J. Elliott, L. Aggoun, and J. B. Moore, Hidden Markov models: Estimation and Control, vol. 29, Springer, 1994; Bayesian reasoning, see C. M. Bishop, Pattern Recognition and Machine Learning, Springer, 2006, and spatial and time series processing.

HMMs are especially widespread in speech processing and recognition. Many popular speech recognition toolkits use HMMs: Hidden Markov Model Toolkit (HTK); see S. Young, G. Evermann, D. Kershaw, G. Moore, J. Odell, D. Ollason, V. Valtchev, and P. Woodland, "The HTK book," Cambridge University Engineering Department, vol. 3, 2002; Sphinx, W. Walker, P. Lamere, P. Kwok, B. Raj, R. Singh, E. Gouvea, P. Wolf, and J. Woelfel, "Sphinx-4: A flexible open source framework for speech recognition," 2004, SONIC B; Pellom and K. Hacioglu, "Recent improvements in the CU SONIC ASR system for noisy speech: The SPINE task," in Proc. ICASSP. IEEE, 2003, vol. 1, pp. 1-4; RASR D. Rybach, C. Gollan, G. Heigold, B. Hoffmeister, J. Lf, R. Schlter, and H. Ney, "The RWTH Aachen University open source speech recognition system," in Proc. Interspeech, 2009, pp. 2111-2114; Kaldi D. Povey, A. Ghoshal, G. Boulianne, L. Burget, O. Glembek, N. Goel, M. Hannemann, P. Mothcek, Y. Qian, P. Schwarz, et al., "The Kaldi speech recognition toolkit," in Proc. ASRU, 2011; Attila H. Soltau, G. Saon, and B. Kingsbury, "The IBM Attila speech recognition toolkit," in Proc. SLT. IEEE, 2010, pp. 97-102; Y. Chow, M. Dunham, O. Kimball, M. Krasner, G. Kubala, J. Makhoul, P. Price, S. Roucos, and R. Schwartz, "BYBLOS: The BBN continuous speech recognition system," in Proc. ICASSP. IEEE, 1987, vol. 12, pp. 89-92]; and Watson V. Goffin, C. Allauzen, E. Bocchieri, D. Hakkani-Tur, A. Ljolje, S. Parthasarathy, M. Rahim, G. Riccardi, and M. Saraclar, "The AT&T Watson speech recognizer," in Proc. ICASSP, 2005, pp. 1033-1036.

HMMs relate to neural networks in several ways. The forward algorithm of Baum-Welch HMM training resembles the training of some recurrent neural networks. J. S. Bridle, "Alpha-Nets: A recurrent neural network architecture with a hidden Markov model interpretation," Speech Communication, vol. 9, no. 1, pp. 83-92, 1990. Modern automatic speech recognition also relies on both HMMs and neural networks. Neural-HMM hybrid architectures have improved the performance of speech recognition in many cases.

Earlier efforts, A. Krogh, M. Brown, I. S. Mian, K. Sjolander, and D. Haussler, "Hidden Markov models in computational biology: Applications to protein modeling," Journal of molecular biology, vol. 235, no. 5, pp. 1501-1531, 1994, S. R. Eddy et al., "Multiple alignment using hidden Markov models," in Proc. ISMB, 1995, vol. 3, pp. 114-120, used annealed noise to perturb the model parameters and to pick an alignment path between HMM states and the observed speech data.

Training hidden Markov models is computational intensive, and can take a great deal of time. The prior art has not addressed this drawbrack of such training in any fundamental, data-dependent way.

SUMMARY

A learning computer system may estimate unknown parameters and states of a stochastic or uncertain system having a probability structure. The system may include a data processing system that may include a hardware processor. The system may: receive data; generate random, chaotic, fuzzy, or other numerical perturbations of the data, one or more of the states, or the probability structure; estimate observed and hidden states of the stochastic or uncertain system using the data, the generated perturbations, previous states of the stochastic or uncertain system, or estimated states of the stochastic or uncertain system; and cause perturbations or independent noise to be injected into the data, the states, or the stochastic or uncertain system so as to speed up training or learning of the probability structure and of the system parameters or the states.

The data processing system may cause the perturbations of the data, states, or probability structure to speed up training of a hidden Markov model.

The perturbations of the data, states, or probability structure may satisfy the Noisy Expectation Maximization (NEM) condition.

The system may make HMM state or parameter estimates and the perturbations may be used to improve the accuracy of the estimates.

The data processing system may cause the perturbations of the data to speed up training of the hidden Markov model.

The perturbations may train or update one or more mixture models in the probability structure.

One or more of the mixture models may include a Gaussian mixture model.

The injected perturbations or noise may have a rate that decays as the training proceeds.

The injection may include adding, multiplying, exponentiating the data, states, or probability structure with the perturbations or independent noise.

A non-transitory, tangible, computer-readable storage media may contain a program of instructions that cause a computer system comprising a data processing system that includes a hardware processor running the program of instructions to estimate unknown parameters and states of a stochastic or uncertain system having a probability structure using one or more of the approaches described herein.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Noise can speed training in hidden Markov models (HMMs). A Noisy Expectation-Maximization (NEM) algorithm may inject noise when learning the maximum-likelihood estimate of the HMM parameters because an underlying Baum-Welch training algorithm is a special case of the Expectation-Maximization (EM) algorithm. The NEM theorem may give a sufficient condition for such an average noise boost. The condition may be a simple quadratic constraint on the noise when the HMM uses a Gaussian mixture model at each state. The noise benefit condition is derived for the case of an HMM with a Binomial mixture model (BMM) at each state. Simulations show that a noisy HMM converges faster than a noiseless HMM on the TIMIT data set.

Careful noise injection can speed the training process for a hidden Markov model (HMM). The proper noise appears to help the training process explore less probable regions of the parameter space. The new system is called a noisy HMM or NHMM.

Figure 1:
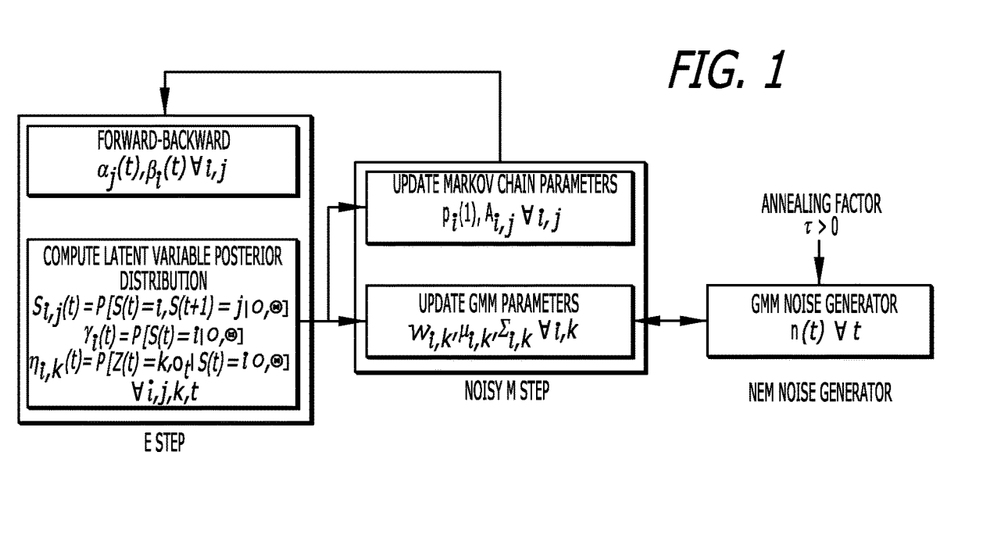
FIG. 1 illustrates an example of NHMM architecture based on a noise-enhanced version of the expectation-maximization (EM) algorithm.
Figure 2:
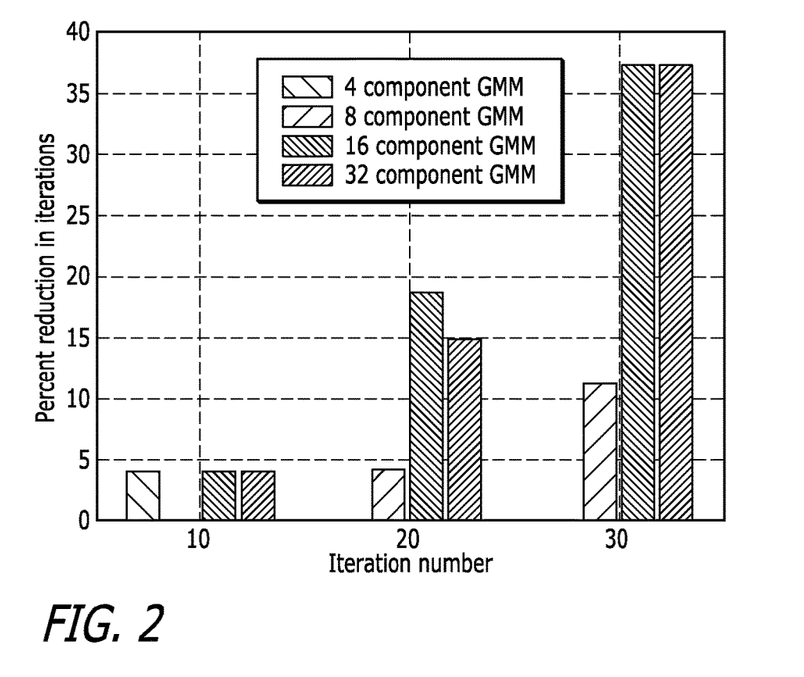
FIG. 2 illustrates an example of noise that produces a 37% reduction in the number of iterations that it takes to converge to the maximum-likelihood estimate.
Figure 3A:
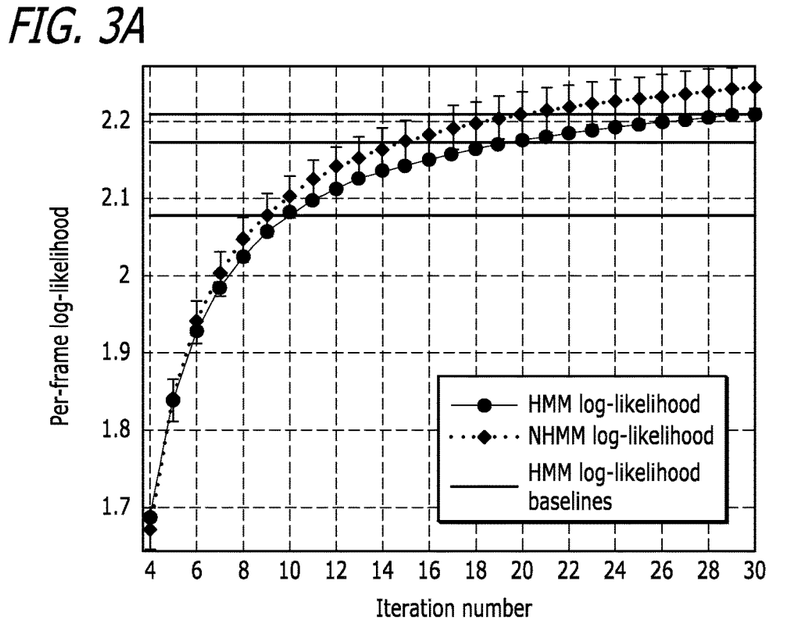
FIGS. 3A-3B illustrate examples of simulation instances where the NHMM converges more quickly than does the standard or noiseless HMM that uses Gaussian mixture models.
Figure 3B:
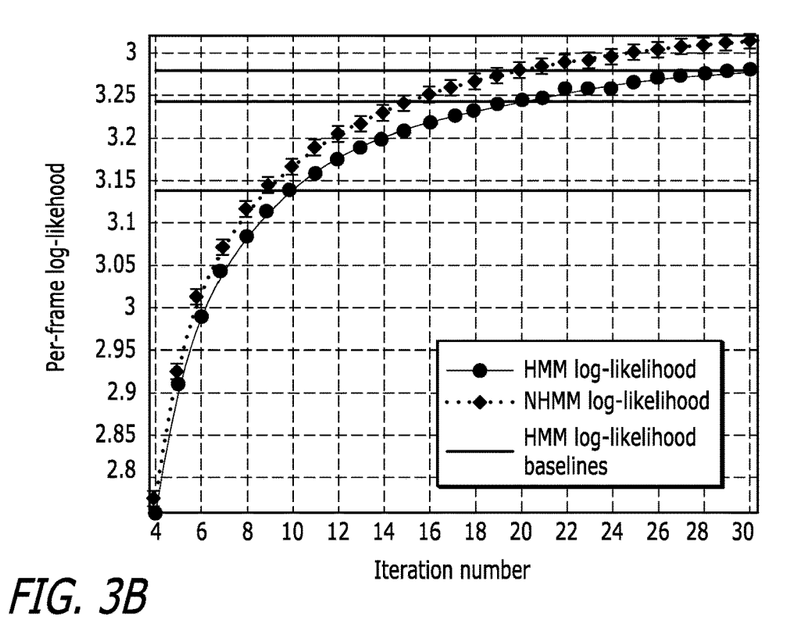
Figure 4:
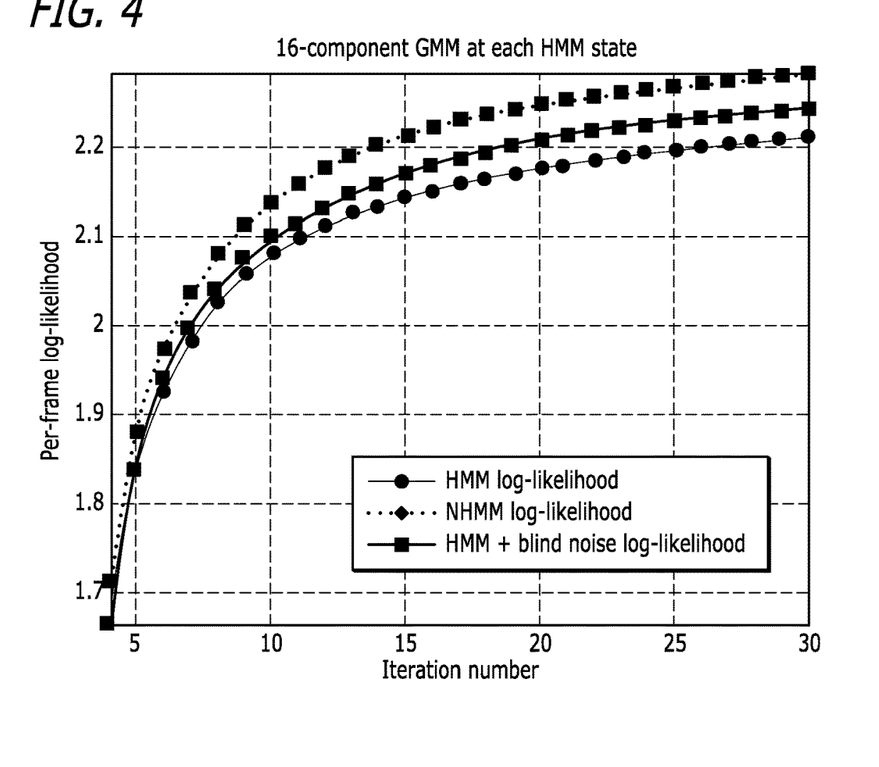
FIG. 4 illustrates that the NHMM may converge faster than an HMM with simple annealed "blind noise" added to the training data. Such blind noise may not satisfy the key sufficient condition in the noise-enhanced EM algorithm.

FIG. 1 illustrates an example of NHMM architecture based on a noise-enhanced version of the expectation-maximization (EM) algorithm. FIG. 2 illustrates an example of noise that produces a 37% reduction in the number of iterations that it takes to converge to the maximum-likelihood estimate. FIGS. 3A-3B illustrate examples of simulation instances where the NHMM converges more quickly than does the standard or noiseless HMM that uses Gaussian mixture models. FIG. 4 illustrates that the NHMM may converge faster than an HMM with simple annealed ?blind noise? added to the training data. Such blind noise may not satisfy the key sufficient condition in the noise-enhanced EM algorithm.

The NHMM may be a special case of a recent noisy EM (NEM) model, see O. Osoba, S. Mitaim, and B. Kosko, "Noise Benefits in the Expectation-Maximization Algorithm: NEM theorems and Models," in The International Joint Conference on Neural Networks (IJCNN). IEEE, 2011, pp. 3178-3183; and O. Osoba, S. Mitaim, and B. Kosko, "The Noisy Expectation-Maximization Algorithm," Fluctuation and Noise Letters, vol. 12, no. 13, 1350012-1 1350012-30, September 2013. The underlying NEM theorem states that the noise-enhanced EM algorithm converges faster on average to the maximum-likelihood optimum than does the noiseless EM algorithm if the noise obeys a positivity condition. The condition reduces to a quadratic constraint on the injected noise in the special but important case of a Gaussian mixture model. The NEM algorithm gives rise to the NHMM because the Baum-Welch algorithm that trains the HMM parameters is itself a special case of the EM algorithm. See L. E. Baum, T. Petrie, G. Soules, and N. Weiss, "A maximization technique occurring in the statistical analysis of probabilistic functions of Markov chains," The Annals of Mathematical Statistics, pp. 164-171, 1970. Theorem 1 below states the corresponding sufficient condition for an HMM noise boost. This is a type of "stochastic resonance" effect where a small amount of noise improves the performance of a nonlinear system while too much noise harms the system.

The simulations below confirm the theoretical prediction that proper injection of noise can improve speech recognition. This is a deliberate use of noise injection in the speech data itself. Earlier efforts, A. Krogh, M. Brown, I. S. Mian, K. Sjolander, and D. Haussler, "Hidden Markov models in computational biology: Applications to protein modeling," Journal of molecular biology, vol. 235, no. 5, pp. 1501-1531, 1994, and S. R. Eddy et al., "Multiple alignment using hidden Markov models," in Proc. ISMB, 1995, vol. 3, pp. 114-120, used annealed noise to perturb the model parameters and to pick an alignment path between HMM states and the observed speech data. These earlier efforts neither added noise to the speech data nor found any theoretical guarantee of a noise benefit.

The Noisy Expectation-Maximization Theorem

The Noisy Expectation-Maximization (NEM) algorithm (see O. Osoba, S. Mitaim, and B. Kosko, "Noise Benefits in the Expectation-Maximization Algorithm: NEM theorems and Models," in The International Joint Conference on Neural Networks (IJCNN). IEEE, 2011, pp. 3178-3183, and O. Osoba, S. Mitaim, and B. Kosko, "The Noisy Expectation-Maximization Algorithm," Fluctuation and Noise Letters, vol. 12, no. 13, 1350012-1-1350012-30, September 2013) modifies the EM scheme and achieves faster convergence times on average. The NEM algorithm injects additive noise into the data at each EM iteration. The noise must decay with the iteration count to guarantee convergence to the optimal parameters of the original data model. The additive noise must also satisfy the NEM condition below. The condition guarantees that the NEM parameter estimates will climb faster up the likelihood surface on average.

NEM Theorem

The NEM Theorem (see O. Osoba, S. Mitaim, and B. Kosko, "Noise Benefits in the Expectation-Maximization Algorithm: NEM theorems and Models," in The International Joint Conference on Neural Networks (IJCNN) IEEE) states a general sufficient condition when noise speeds up the EM algorithm's convergence to the local optimum of the likelihood surface. The NEM Theorem uses the following notation. The noise random variable N has pdf f(n|o). So the noise N can depend on the observed data O. $\mathcal{L}$ are the latent variables in the model. $\{\Theta^{(n)}\}$ is a sequence of EM estimates for $\Theta$. $\Theta^*$ is the converged EM estimate for $\Theta$: $\Theta^* = \lim_{n \to \infty} \Theta^{(n)}$. Define the noisy $Q_N$ function $Q_N(\Theta|\Theta^{(n)}) = \mathbb{E}_{\mathcal{L} \setminus O, \Theta^{(n)}}[\ln f(o+N, \mathcal{L}|\Theta)]$. Assume that all random variables have finite differential entropy. Assume further that the additive noise keeps the data in the likelihood function's support. Then we can state the NEM theorem.

Theorem 1. Noisy Expectation Maximization (NEM)
The EM Estimation Iteration Noise Benefit $$Q(\Theta_*|\Theta_*) - Q(\Theta^{(n)}|\Theta_*) \geq Q(\Theta_*|\Theta_*) - Q_N(\Theta^{(n)}|\Theta_*) \quad (1)$$

or equivalently $$Q_N(\Theta^{(n)}|\Theta_*) \geq Q(\Theta^{(n)}|\Theta_*) \quad (2)$$

holds on average if the following positivity condition holds:

$$\mathbb{E}_{O,\mathcal{L},N|\Theta^*}\left[\ln\left(\frac{f(O+N, \mathcal{L}|\Theta^{(n)})}{f(O, \mathcal{L}|\Theta^{(n)})}\right)\right] \geq 0. \quad (3)$$

The NEM Theorem states that each iteration of a suitably noisy EM algorithm gives higher likelihood estimates on average than the noiseless EM algorithm gives at each iteration. So the NEM algorithm converges faster than EM does if the data model can be identified. The faster NEM convergence occurs both because the likelihood function has an upper bound and because the NEM algorithm takes larger average steps up the likelihood surface.

Many latent-variable models (such as GMM and HMM) are not identifiable, H. Teicher, "On the mixture of distributions," The Annals of Mathematical Statistics, pp. 55-73, 1960., H. Teicher, "Identifiability of finite mixtures," The Annals of Mathematical Statistics, vol. 34, no. 4, pp. 1265-1269, 1963, and thus do not have global likelihood optima. The EM and NEM algorithms converge to local optima in these cases. But the added noise in the NEM algorithm may cause the NEM estimates to search nearby local optima. The NEM Theorem still guarantees that NEM estimates have higher likelihood on average than the EM estimates have for such non-identifiable models.

Gaussian mixture model (GMM) parameter estimation greatly simplifies the NEM positivity condition in (3) O. Osoba, S. Mitaim, and B. Kosko, "Noise Benefits in the Expectation-Maximization Algorithm: NEM theorems and Models,". Consider the GMM pdf in (??). The model satisfies the positivity condition (3) when the additive noise sample $N = (N_1, \ldots, N_D)$ for each observation vector $o = (o_1, \ldots, o_D)$ satisfies the following quadratic constraint:

$$N_d[N_d - 2(\mu_{i,k,d} - o_d)] \leq 0 \text{ for all } k. \quad (4)$$

The Noise-Enhanced HMM

The state sequence S and the Gaussian index Z are the latent variables $\mathcal{L}$ for an HMM. The noisy Q-function for the NHMM is $$Q_N(\Theta|\Theta^{(n)}) = \sum_{i=1}^{M} \gamma_i^{(n)}(1) \log p_i(1) + \quad (5)$$

$$\sum_{t=1}^{T}\sum_{i=1}^{M}\sum_{k=1}^{K} \eta_{i,k}^{(n)}(t)\left\{\log w_{i,k} + \log \mathcal{N}\left(o_t + n_t | \mu_{i,k}, \sum_{i,k}\right)\right\} +$$

$$\sum_{t=1}^{T-1}\sum_{i=1}^{M}\sum_{j=1}^{M} \zeta_{i,j}^{(n)}(t) \log A_{i,j}$$

where $n_t \in \mathbb{R}^D$ is the noise vector for the observation $o_t$. Then the $d^{th}$ element $n_{t,d}$ of this noise vector satisfies the following positivity constraint:

$$n_{t,d}[n_{t,d} - 2(\mu_{i,k,d}^{(n-1)} - o_{t,d})] \leq 0 \text{ for all } k \quad (6)$$

where $\mu_{i,k}^{(n-1)}$ is the mean estimate at iteration n−1. We also note that noise can provably speed convergence of the Markov chain (see B. Franzke and B. Kosko, "Noise Can Speed Convergence in Markov Chains," Physical Review E, vol. 84, no. 4, pp. 041112, 2011).

Maximizing the noisy Q-function (5) gives the update equations for the M-step. Only the GMM mean and covariance update equations differ from the noiseless EM because the noise enters the noisy Q-function (5) only through the Gaussian pdf. But the NEM algorithm requires modifying only the covariance update equation (14) because it uses the noiseless mean estimates (13) to check the positivity condition (20). Then the NEM covariance estimate is $$\sum_{i,k}^{(n)} = \frac{\sum_{t=1}^{T} \eta_{i,k}^{(n)}(t)(o_t + n_t - \mu_{i,k}^{(n)})(o_t + n_t - \mu_{i,k}^{(n)})^T}{\sum_{t=1}^{T} \gamma_i^{(n)}(t)} \quad (7)$$

NEM technique can apply more generally to other mixture models and exponential family PDFs. O. Osoba and B. Kosko, "The Noisy Expectation-Maximization Algorithm for Multiplicative Noise Injection," Fluctuation and Noise Letters, vol. 12, no. 13, 1350012-1-1350012-30, September 2013. The next section applies it to the Binomial mixture model.

---

Algorithm NHMM Noise-Injection Training

1:    Initialize parameters: $\Theta^{(1)} \leftarrow \Theta_{init}$
2:    for n = 1 → $n_{max}$ do
3:       function E-STEP($\mathcal{O}, \Theta^n$)
4:          for t = 1 → T, i, j = 1 → M, and k = 1 → K do -continued Algorithm NHMM Noise-Injection Training 5: $Y_i^{(n)}(1) \leftarrow P[S(1) = i | \mathcal{O}, \Theta^{(n)}]$
6: $\eta_{i,k}^{(n)}(t) \leftarrow P[S(t) = i, Z(t) = k | \mathcal{O}, \Theta^{(n)}]$
7: $\zeta_{i,j}^{n}(t) \leftarrow P[S(t+1) = j, S(t) = i | \mathcal{O}, \Theta^{(n)}]$
8: function M-STEP $(\mathcal{O}, \gamma, \eta, \zeta, \tau)$
9: for i, j = 1 → M and k = 1 → K do
10: $P_i^{(n)}(1) \leftarrow \gamma_i^{(n)}(1)$ 11: $A_{i,j}^{(n)} \leftarrow \dfrac{\sum_{t=1}^{T-1} \zeta_{i,j}^{(n)}(t)}{\sum_{t=1}^{T-1} \gamma_i^n(t)}$ 12: $w_{i,k}^{(n)} \leftarrow \dfrac{\sum_{t=1}^{T} \eta_{i,k}^{(n)}(t)}{\sum_{t=1}^{T} \gamma_i^{(n)}(t)}$ 13: $\mu_{i,k}^{(n)} \leftarrow \dfrac{\sum_{t=1}^{T} \eta_{i,k}^{(n)}(t) o_t}{\sum_{t=1}^{T} \gamma_i^{(n)}(t)}$ 14: $n_t \leftarrow$ GENERATE NOISE $(\mu_{i,k}^{(n)}, o_t, n^{-T} \sigma_N^2)$ 15: $\sum_{i,k}^{(n)} = \dfrac{\sum_{t=1}^{T} \eta_{i,k}^{(n)}(t)(o_t + n_t - \mu_{i,k}^{(n)})(o_t + n_t - \mu_{i,k}^{(n)})^T}{\sum_{t=1}^{T} Y_i^{(n)}(t)}$ 16: function GENERATE NOISE $(\mu_{i,k}^{(n)}, o_t, \sigma^2)$
17: $n_t \leftarrow \mathcal{N}(0, \sigma^2)$
18: for d = 1 → D do
19: if $n_{t,d} [n_{t,d} - 2(\mu_{i,k,d}^{(n-1)} - o_{t,d})] > 0$ for some k then
20: $n_{t,d} = 0$
21: return $n_t$ Noise Benefits in Binomial Mixture Model (BMM) HMM A Binomial mixture model (BMM) HMM contains a mixture of Binomial PDFs at each HMM state. It is especially popular in bio-informatics and genomics. The PDF $f_i$ of an observation $o \in Z_D^+$ in a BMM-HMM is $$f_i(o) \sum_{k=1}^{K} w_{i,k} \binom{D}{o} p_{i,k}^o (1 - p_{i,k})^{D-o} \quad (8)$$

where $P_{i,k}$ is the parameter of the k-th Binomial distribution at state i of the HMM. We restrict the discussion to non-negative integer noise n for addition to the BMM-HMM since Binomial random variables are non-negative integers.

Next presented is the NEM sufficient condition for a BMM-HMM.

Theorem 2. BMM-HMM Noise Benefit Condition

Non-negative integer noise n added to the observation o of a BMM-HMM speeds-up Baum-Welch estimation of its parameters if $$\binom{D}{o+n} p_{i,k}^n (1 - p_{i,k})^{-n} \geq \binom{D}{o} \text{ for all } k. \quad (9)$$

Proof. The NEM positivity condition gives $$\log\left(\dfrac{f_i(o + n, Z | \Theta^{(n)})}{f_i(o, Z | \Theta^{(n)})}\right) \geq 0. \quad (10)$$

The ratio simplifies into the following component-wise condition for all k:

$$\binom{D}{o+n} p_{i,k}^o (1 - p_{i,k})^{D-o-n} \geq \binom{D}{o} p_{i,k}^o (1 - p_{i,k})^{D-o} \quad (11)$$

or equivalently $$\binom{D}{o+n} p_{i,k}^o (1 - p_{i,k})^{1-o} \geq \binom{D}{o} \text{ for all } k. \quad (11)$$

Simulation Results

The Hidden Markov Model Toolkit (HTK) (see S. Young, G. Evermann, D. Kershaw, G. Moore, J. Odell, D. Ollason, V. Valtchev, and P. Woodland, "The HTK book," Cambridge University Engineering Department, vol. 3, 2002) may be modified to train the NHMM. HTK provides a tool called "HERest" that performs embedded Baum-Welch training for an HMM. This tool first creates a large HMM for each training speech utterance. It concatenates the HMMs for the sub-word units. The Baum-Welch algorithm tunes the parameters of this large HMM.

The NHMM algorithm used (7) to modify covariance matrices in HERest. We sampled from a suitably truncated Gaussian pdf to produce noise that satisfied the NEM positivity condition (6). We used noise variances in {0.001, 0.01, 0.1, 1}. A deterministic annealing factor $n^{-r}$ scaled the noise variance at iteration n. The noise decay rate was $\tau > 0$. We used $\tau \in [1, \ldots, 10]$. We then added the noise vector to the observations during the update of the covariance matrices (7).

The simulations used the TIMIT speech dataset (see J. S. Garofolo, TIMIT: Acoustic-phonetic Continuous Speech Corpus, Linguistic Data Consortium, 1993. with the standard setup in A. K. Halberstadt and J. R. Glass, "Heterogeneous acoustic measurements for phonetic classification," in Proc. Eurospeech, 1997, vol. 97, pp. 401-404). The speech signal was parameterized with 12 Mel-Frequency Cepstral Coefficients (MFCC) computed over 20-msec Hamming windows with a 10-msec shift. The first- and second-order finite differences of the MFCC vector were appended with the energies of all three vectors. 3-state left-to-right HMMs were used to model each phoneme with a K-component GMM at each state. K was varied over 1, 4, 8, 16, 32 for the experiments and used two performance metrics to compare NHMM with HMM.

The first metric was the percent reduction in EM iterations for the NHMM to achieve the same per-frame log-likelihood as does the noiseless HMM at iterations 10, 20, and 30. The second metric was the median improvement in per-frame log-likelihood over 30 training iterations.

FIG. 2 illustrates an example of the percent reduction in the number of training iterations for the NHMM compared to the HMM log-likelihood at iterations 10, 20, and 30. Noise substantially reduced the number of iterations for 16- and 32-component GMMs. But it only marginally improved the other cases. This holds because the noise is more likely to satisfy the NEM positivity condition when the number of data samples is small relative to the number of parameters. O. Osoba, S. Mitaim, and B. Kosko, "The Noisy Expectation-Maximization Algorithm," Fluctuation and Noise Letters, vol. 12, no. 13, 1350012-1-1350012-30, September 2013. FIGS. 3A-3B compare the per-frame log-likelihood of the training data for the HMM and the NHMM. The NHMM has a substantially higher log-likelihood than does the HMM for the 16- and 32-component GMM cases.

FIG. 4 shows the comparison between NHMM and HMM with blind noise added to the training data. We did not constrain the blind noise samples to satisfy the noise benefit inequality in (6). The annealed blind noise followed the same cooling schedule and used the same mean and variance as the NEM noise. This figure shows that NHMM gives significantly better log-likelihood than the blind noise HMM. Simulated annealing and blind annealed noise injection also do not guarantee the faster-than-EM convergence that NEM guarantees. The figures in the paper show that NEM gives better likelihoods at each iteration and that NEM converges faster in the long run.

Figure 5:
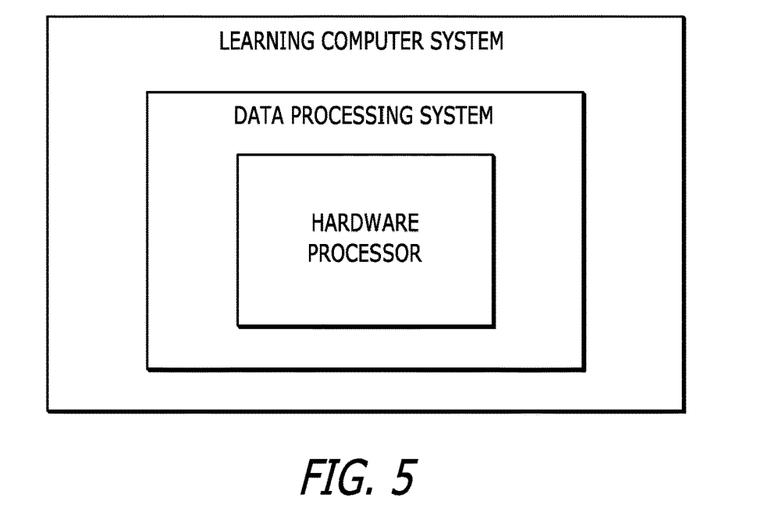
FIG. 5 illustrates an example of a learning computer system.

FIG. 5 illustrates an example of a learning computer system that estimates unknown parameters and states of a stochastic or uncertain system having a probability structure. The learning computer system is configured to implement the various algorithms that have been discussed herein. The learning computer system includes a data processing system, and one or more hardware processors. The learning computer system may also include one or more tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

The learning computer system may include one or more computers at the same or different locations. When at different locations, the computers may be configured to communicate with one another through a wired and/or wireless network communication system.

The learning computer system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors. The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

For example, noise is not the only injected perturbation that the invention can use. Other perturbations include chaos, fuzz, and scaled random variables. Nor is adding noise to the data the only form of injection. Multiplicative noise or perturbations will also work as will any other combination of the data with such perturbations. These injections can also reach the probability structure of the model as well as the data.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A learning computer system that estimates unknown parameters and states of a stochastic or uncertain system having a probability structure comprising a data processing system that includes a hardware processor that has a configuration that:
   receives data;
   generates perturbations or independent noise of the data, one or more of the states, or the probability structure, wherein the perturbations are random, chaotic, fuzzy, or other numerical perturbations;
   estimates states of the stochastic or uncertain system using the data, perturbations, independent noise, previous states of the stochastic or uncertain system, or estimated states of the stochastic or uncertain system; and
   causes the perturbations or the independent noise to be injected into the data, the states, or the stochastic or uncertain system so as to speed up training or learning of the probability structure and of system parameters or the states; the perturbations or independent noise satisfying the Noisy Expectation Maximization (NEM) prescriptive condition defined by equation 3:

$$\mathbb{E}_{O,\mathcal{L},N|\Theta^*} = \left[\ln\left(\frac{f(O+N, \mathcal{L}|\Theta^{(n)})}{f(O, \mathcal{L}|\Theta^{(n)})}\right)\right] \geq 0 \qquad (3)$$

wherein $\mathbb{E}$ is an E step of an expectation-maximization iteration; O is observed data; $\mathcal{L}$ is the latent variables; N is a noise random variable; $\Theta^*$ is a converged value of $\Theta^{(n)}$; $\Theta^{(n)}$ is a sequence of EM estimates; f is a probability distribution function.

2. The learning computer system of claim 1 wherein the data processing system has a configuration that causes the perturbations or independent noise of the data, states, or probability structure to speed up training of a hidden Markov model.

3. The learning computer system of claim 2 wherein system makes HMM state or parameter estimates and the perturbations or independent noise are used to improve accuracy of the estimates.

4. The learning computer system of claim 2 wherein the data processing system has a configuration that causes the perturbations or independent noise of the data to speed up training of the hidden Markov model.

5. The learning computer system of claim 4 wherein the perturbations or independent noise train or update one or more mixture models in the probability structure.

6. The learning computer system of claim 5 wherein one or more of the mixture models includes a Gaussian mixture model.

7. The learning computer system of claim 2 wherein injected perturbations or independent noise has a rate that decays as training proceeds.

8. The learning computer system of claim 1 wherein injection includes adding, multiplying, exponentiating the data, states, or probability structure with the perturbations or independent noise.

9. The learning computer system of claim 1 wherein the data is speech data.

10. The learning computer system of claim 1 wherein the states are the observed states, the hidden states, the previous states, and/or the estimated states.

11. A non-transitory, tangible, computer-readable storage media containing a program of instructions that cause a computer system comprising a data processing system that includes a hardware processor running the program of instructions to estimate unknown parameters and states of a stochastic or uncertain system having a probability structure that:
   receives data;
   generates perturbations or independent noise of the data, one or more of the states, or the probability structure, wherein the perturbations are random, chaotic, fuzzy, or other numerical perturbations;
   estimates states of the stochastic or uncertain system using the data, perturbations, previous states of the stochastic or uncertain system, or estimated states of the stochastic or uncertain system; and
   causes the perturbations or the independent noise to be injected into the data, the states, or the stochastic or uncertain system so as to speed up training or learning of the probability structure and of system parameters or the states; the perturbations or independent noise satisfying the Noisy Expectation Maximization (NEM) prescriptive condition defined by equation 3:

$$\mathbb{E}_{O,\mathcal{L},N|\Theta^*} = \left[\ln\left(\frac{f(O+N, \mathcal{L}|\Theta^{(n)})}{f(O, \mathcal{L}|\Theta^{(n)})}\right)\right] \geq 0 \qquad (3)$$

wherein $\mathbb{E}$ is an E step of an expectation-maximization iteration; O is observed data; $\mathcal{L}$ is the latent variables; N is a noise random variable; $\Theta^*$ is a converged value of $\Theta^{(n)}$; $\Theta^{(n)}$ is a sequence of EM estimates; f is a probability distribution function.

12. The non-transitory, tangible, computer-readable storage media of claim 11 wherein the program of instructions when run causes the perturbations of the data, states, or probability structure to speed up training of a hidden Markov model.

13. The non-transitory, tangible, computer-readable storage media of claim 12 wherein the perturbations or independent noise of the data, states, or probability structure satisfy a Noisy Expectation Maximization (NEM) condition.

14. The non-transitory, tangible, computer-readable storage media of claim 13 wherein the program of instructions when run makes HMM state or parameter estimates and the perturbations or independent noise are used to improve accuracy of the estimates.

15. The non-transitory, tangible, computer-readable storage media of claim 12 wherein the program of instructions when run causes the perturbations or independent noise of the data to speed up training of the hidden Markov model.

16. The non-transitory, tangible, computer-readable storage media of claim 15 wherein perturbations or independent noise train or update one or more mixture models in the probability structure.

17. The non-transitory, tangible, computer-readable storage media of claim 16 wherein one or more of the mixture models includes a Gaussian mixture model.

18. The non-transitory, tangible, computer-readable storage media of claim 12 wherein injected perturbations or independent noise has a rate that decays as training proceeds.

19. The non-transitory, tangible, computer-readable storage media of claim 11 wherein injection includes adding, multiplying, exponentiating the data, states, or probability structure with the perturbations or independent noise.

20. The non-transitory, tangible, computer-readable storage media of claim 11, wherein the states are the observed states, the hidden states, the previous states, and/or the estimated states.

* * * * *